US008410470B2

(12) United States Patent
Omata et al.

(10) Patent No.: US 8,410,470 B2
(45) Date of Patent: Apr. 2, 2013

(54) CORE-SHELL QUANTUM DOT FLUORESCENT FINE PARTICLES

(75) Inventors: Takahisa Omata, Suita (JP); Shinichi Hashimoto, Suita (JP); Katsuhiro Nose, Suita (JP); Satoshi Kobayashi, Tokyo (JP); Yuki Iguchi, Tokyo (JP)

(73) Assignee: Osaka University, Suita-Shi, Osaka (JP)

( * ) Notice: Subject to any disclaimer, the term of this patent is extended or adjusted under 35 U.S.C. 154(b) by 476 days.

(21) Appl. No.: 12/810,443

(22) PCT Filed: Dec. 26, 2008

(86) PCT No.: PCT/JP2008/073714
§ 371 (c)(1),
(2), (4) Date: Jun. 24, 2010

(87) PCT Pub. No.: WO2009/084626
PCT Pub. Date: Jul. 9, 2009

(65) Prior Publication Data
US 2010/0283037 A1 Nov. 11, 2010

(30) Foreign Application Priority Data

Dec. 28, 2007 (JP) ................................. 2007-340724
Dec. 12, 2008 (JP) ................................. 2008-317517

(51) Int. Cl.
*H01L 33/06* (2010.01)
*H01L 33/26* (2010.01)
(52) U.S. Cl. ................. 257/13; 257/17; 257/43; 257/94; 257/103

(58) Field of Classification Search ................ 257/13, 257/14, 43, 40, 76, E29.002, 29.068, 29.069, 257/E29.071; 977/774, 755; 438/99
See application file for complete search history.

(56) References Cited

U.S. PATENT DOCUMENTS
2008/0099728 A1   5/2008   Jin et al.

FOREIGN PATENT DOCUMENTS
| JP | 2003-218470 | 7/2003 |
| JP | 2005-005421 | 1/2005 |
| JP | 2005-264089 | 9/2005 |
| JP | 2006-083246 | 3/2006 |
| WO | WO 2006/033396 A1 | 3/2006 |

OTHER PUBLICATIONS

J.T. Wolan, Chemical alteration of the native oxide layer on LiGaO2(001) by exposure to hyperthermal atomic hydrogen, J.Vac. Sci.technol.A, 1998, vol. 16, No. 6, p. 3414-3419.
Naoyuki Koketsu, "Sol-Gel-ho ni yoru ZnMgO Ryushi no Sakusei to ZnO Ryushi eno ZnMgO Hifuku", Dai 68 Kai Extended abstracts; the Japa Society of Applied Physics, 2007, p. 1465.

*Primary Examiner* — Olik Chaudhuri
*Assistant Examiner* — Quovaunda V Jefferson
(74) *Attorney, Agent, or Firm* — Birch, Stewart, Kolasch & Birch, LLP (57) ABSTRACT

Disclosed is an ultraviolet fluorescent material having high light emission efficiency, wherein the peak wavelength of ultraviolet light to be emitted can be controlled by having a quantum dot structure wherein a fine crystal of zinc oxide having an average diameter of 1-10 nm serves as a core, and the surface of the zinc oxide fine crystal is covered with at least one of $LiGaO_2$, $LiAlO_2$, $NaGaO_2$ and $NaAlO_2$, which has a crystal structure similar to that of the zinc oxide and low lattice mismatch and hardly suffers from structural defects, or a solid solution thereof.

7 Claims, 6 Drawing Sheets

CORE-SHELL QUANTUM DOT FLUORESCENT FINE PARTICLES

TECHNICAL FIELD

The present invention relates to light emitting material. More specifically, it relates to quantum dot fluorescent material. Further, the present invention relates to ultraviolet fluorescent fine particles emitting light in ultraviolet region.

BACKGROUND ART

Zinc oxide (ZnO) having bandgap energy of about 3.37 eV and exciton binding energy as large as 60 meV is considered promising in industrial applications, particularly in an application to self-emitting electronics devices, as a phosphor or light emitting material of near-ultraviolet light (wavelength of about 390 nm) that emits light stably even at room temperature.

A phenomenon has been known generally that, when the size of semiconductor is reduced to be comparable to the wavelength of electron or hole wave function in the semiconductor, so-called quantum confining levels appear in conduction band and valence band and the electrons and holes increase ground state energy. In other words, when a nano-sized semiconductor is formed, the bandgap of the semiconductor becomes larger due to quantum size effect, and emission energy due to recombination between the excited electron in conduction band and the hole in valence band increases as the semiconductor size decreases. Attempts have been made to produce material (a so-called quantum dot material) that can provide near-ultraviolet emission having desired emission peak wavelength and desired half width, utilizing the quantum size effect, by controlling the size of zinc oxide nano particles.

DISCLOSURE OF THE INVENTION

Problems to be Solved by the Invention

In order to form the quantum dot material from inorganic material, however, it is necessary to coat the nano particle with a material having certain characteristics as a potential barrier layer or a distributed matrix of the zinc oxide nano particle and, in addition, to passivate surface level of zinc oxide. That is, it is necessary to form a three-dimensional quantum well structure without any deactivation path. Characteristics required of the material are as follows. The material must be a wide gap semiconductor having energy of the bottom of the conduction band higher than the quantum confining level of electrons formed in the conduction band of zinc oxide and energy of the top of the valence band lower than the quantum confining level of holes formed in the valence band of zinc oxide. When electronics devices are formed by arranging many quantum dots of uniform size on an amorphous or poly-crystalline substrate or base material, use of colloidal core-shell quantum dots synthesized by wet chemical process of, for example, sol-gel method has an overwhelming advantage. In such a process, it is essential that the shell material, which corresponds to the potential barrier layer, is grown epitaxially on zinc oxide as the core material and grown substantially without defect formation so that transition probability through defect level does not counter transition probability between quantum confining levels. Specifically, the material is required to attain lattice matching with zinc oxide as the core material in its growth, to satisfy the band structure described above, and to have a characteristic not prone to defect formation.

In the field of fabricating core-shell quantum dots having zinc oxide as the core, prior techniques that successfully attained emission clearly from the quantum confining levels are limited to those utilizing amorphous silicon oxide or organic resin used as the shell. Naturally, these are not inorganic semiconductor quantum dots and, therefore, material insulation and matching of energy level are hard to attain. Consequently, application to light emitting diodes, electroluminescence devices and semiconductor laser devices has been difficult.

ZnO has a crystal structure similar to that of GaN and ZnS, and has extremely high covalent character among the oxide and, hence, it is atypical of wide gap semiconductors. Considering the task of increasing the semiconductor bandgap utilizing quantum size effect exhibited in the nano-sized particles, it is generally difficult to produce ZnO nano particles having the diameter of a few nm or smaller. Further, handling of nano particle powder as fluorescent powder is known to be difficult, since the powder has high reaction activity.

Further, as described above, in synthesizing core-shell semiconductor quantum dots, it is necessary to grow coherently a wide gap semiconductor, which has energy of the bottom of the conduction band higher than the quantum confining level of electrons formed in the conduction band of zinc oxide and energy of the top of the valence band lower than the quantum confining level of holes formed in the valence band of zinc oxide, as the shell material around the zinc oxide nano particle, and to realize a crystal structure with extremely few defects, so as to ensure electron and/or hole conduction or ballistic conduction of carriers accelerated by high electric field. Unless these conditions are satisfied, light emission between quantum confining levels or exciton recombination emission cannot be realized. A material that simultaneously satisfy these conditions has not been known, due to crystal lattice mismatch, defect formation during growth, or low electric conductivity.

Means for Solving the Problems

The configuration of the present invention is as follows:
(Configuration 1)
Core-shell quantum dot fluorescent fine particles, each having
a core formed of zinc oxide nanocrystals having average diameter of 1 nm to 10 nm, and
a semiconductor shell formed of any of lithium gallium oxide, lithium aluminum oxide, sodium gallium oxide and sodium aluminum oxide, coating the surface of said core; wherein
said core and said semiconductor shell form a type I three-dimensional quantum well.

Here, the composition of lithium gallium oxide, lithium aluminum oxide, sodium gallium oxide or sodium aluminum oxide is not limited to a prescribed stoichiometric composition. These oxides may have any composition provided that the core and the semiconductor shell formed of any of these oxides form type I three-dimensional quantum well.
(Configuration 2)
Core shell quantum dot fluorescent fine particles, each having
a core formed of zinc oxide nanocrystals having average diameter of 1 nm to 10 nm, and
a semiconductor shell formed of a solid solution of at least two selected from lithium gallium oxide, lithium aluminum oxide, sodium gallium oxide and sodium aluminum oxide, coating the surface of said core; wherein energy of the top of the valence band of said semiconductor shell is lower than energy of the top of the valence band of said core, and energy of the bottom of the conduction band of said semiconductor shell is higher than energy of the bottom of the conduction band of said core; and said core and said semiconductor shell form a type I three-dimensional quantum well.

Here, the composition of lithium gallium oxide, lithium aluminum oxide, sodium gallium oxide and sodium aluminum oxide is not limited to a prescribed stoichiometric composition. These oxides may have any composition provided that the core and the semiconductor shell formed of a solid solution of these oxides form type I three-dimensional quantum well.

(Configuration 3)

Core shell quantum dot fluorescent fine particles, each having a core formed of zinc oxide nanocrystals having average diameter of 1 nm to 10 nm, and a semiconductor shell formed of any of $LiGaO_2$, $LiAlO_2$, $NaGaO_2$ and $NaAlO_2$, coating the surface of said core; wherein said core and said semiconductor shell form a type I three-dimensional quantum well.

(Configuration 4)

Core shell quantum dot fluorescent fine particles, each having a core formed of zinc oxide nanocrystals having average diameter of 1 nm to 10 nm, and a semiconductor shell formed of a solid solution of at least two selected from $LiGaO_2$, $LiAlO_2$, $NaGaO_2$ and $NaAlO_2$, coating the surface of said core; wherein energy of the top of the valence band of said semiconductor shell is lower than energy of the top of the valence band of said core, and energy of the bottom of the conduction band of said semiconductor shell is higher than energy of the bottom of the conduction band of said core; and said core and said semiconductor shell form a type I three-dimensional quantum well.

(Configuration 5)

The core-shell quantum dot fluorescent fine particles according to any of Configurations 1 to 4, wherein thickness of said semiconductor shell is 0.1 nm to 5 nm.

(Configuration 6)

The core-shell quantum dot fluorescent fine particles according to any of Configurations 1 to 5, wherein said semiconductor shell has its surface modified by an organic compound molecule, and said fluorescent fine particles can be dispersed in a solvent.

(Configuration 7)

The core-shell quantum dot fluorescent fine particles according to any of Configurations 1 to 6, wherein said semiconductor shell is formed by solution synthesis.

Here, the solution synthesis may be conducted in an aqueous solution or a non-aqueous solvent.

That is, the present invention provides: core-shell quantum dot fluorescent fine particles each having a core of zinc oxide ZnO nanocrystals having average diameter of 1 nm to 10 nm; wherein the surface of the core is coated by a semiconductor shell formed of any of $LiGaO_2$, $LiAlO_2$, $NaGaO_2$ and $NaAlO_2$, or the surface of the core is coated by a semiconductor shell formed of a solid solution of at least two selected from $LiGaO_2$, $LiAlO_2$, $NaGaO_2$ and $NaAlO_2$; the energy of the top of the valence band of the semiconductor shell is lower than the energy of the top of the valence band of the core, and the energy of the bottom of the conduction band of the semiconductor shell is higher than the energy of the bottom of the conduction band of said core; and a type I three-dimensional quantum well is formed.

Further, the core of zinc oxide may be manufactured by heating fine powder of metal zinc in an organic solvent having an oxidant dissolved therein, or by the sol-gel method in which zinc carboxylate is decomposed by alkaline substance, or by a method of heating an organic zinc compound in an organic solvent having a surfactant dissolved therein.

By utilizing solution reaction, ZnO nanocrystals having the diameter of 1 to 10 nm are synthesized as a core from organic zinc compound as a raw material, and the surface of zinc oxide particle is coated by one of $LiGaO_2$, $LiAlO_2$, $NaGaO_2$ and $NaAlO_2$ having a crystal structure similar to that of zinc oxide and not prone to lattice mismatch with zinc oxide crystal, to form a shell. Alternatively, the surface of zinc oxide nanocrystals is coated by a solid solution of at least two selected from the materials mentioned above. Thus, a so-called type I semiconductor quantum dot structure can be realized, and emission of light having narrow spectrum from quantum confining levels formed in zinc oxide can be attained.

Further, as the thickness of coating layer (shell) is set to be 5 nm or thinner, formation of any defect in the shell during the growth of the shell can be prevented, and high light emission efficiency can be attained.

By terminating the surface of coating layer with an organic compound, the quantum dots become soluble in a solvent, so that aggregation of quantum dots can be prevented, reactivity can be inactivated, and the dots can be provided as light emitting material matching the device fabrication process that uses so-called colloidal quantum dots as a material.

Effects of the Invention

Using organic zinc compound as raw material, ZnO nanocrystals are synthesized to be the core, and one of or a solid solution of $LiGaO_2$, $LiAlO_2$, $NaGaO_2$ and $NaAlO_2$ having a crystal structure similar to zinc oxide and very few lattice mismatch with zinc oxide is epitaxially grown to coat the surface of zinc oxide particle to form a shell having extremely low interface state and defect level densities.

Figure 3:
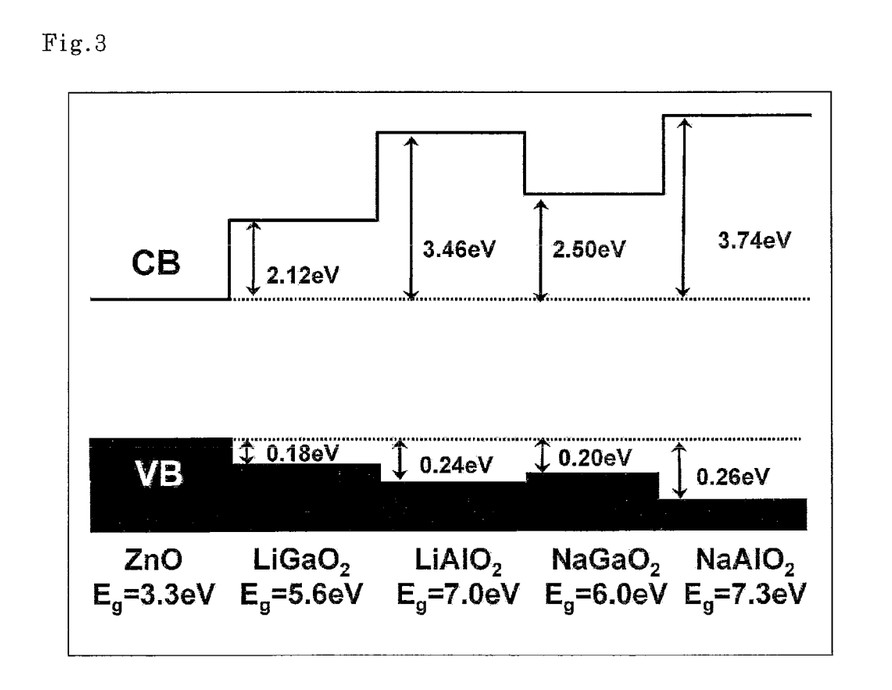

Coating (forming a shell over) the zinc oxide fine crystals (core fine particle) with such substances attains a good function as a well barrier of quantum dots in which the zinc oxide forms a potential well. Passivation of surface level including termination of dangling bond of the zinc oxide surface occurs effectively. The semiconductor shell has energy of the top of the valence band lower than energy of the top of the valence band of zinc oxide, and the semiconductor shell has energy of the bottom of the conduction band higher than energy of the bottom of the conduction band of zinc oxide, so that type I three-dimensional quantum well can be formed. As shown in FIG. 3, $LiGaO_2$ has bandgap of about 5.6 eV, band offset between zinc oxide and $LiGaO_2$ in the conduction band of about 2.12 eV and band offset in the valence band of about 0.18 eV; $LiAlO_2$ has bandgap of about 7.0 eV, band offset between zinc oxide and $LiAlO_2$ in the conduction band of about 3.46 eV and band offset in the valence band of about 0.24 eV; $NaGaO_2$ has bandgap of about 6.0 eV, band offset between zinc oxide and $NaGaO_2$ in the conduction band of about 2.50 eV and band offset in the valence band of about 0.20 eV; and $NaAlO_2$ has bandgap of about 7.3 eV, band offset between zinc oxide and $NaAlO_2$ in the conduction band of about 3.74 eV and band offset in the valence band of about 0.26 eV. Therefore, each substance functions as a quantum well potential barrier with zinc oxide being the well, whereby electrons and holes are confined in the three-dimensional quantum well, that is, in the quantum dot, and quantum confining levels can be formed stably in the quantum well. Further, the confined electron-hole pair can form an exciton, realizing a very stable excited state. Because of continuous formation of crystal lattice, the density of state of interface state generated between the core and shell simultaneously with the passivation of zinc oxide surface is so small as to be unobservable. In accordance with the band structure of zinc oxide and shell material, a three-dimensional quantum well structure (quantum dot structure) having very small perturbation can be formed. The electrons and holes excited in zinc oxide are not trapped by the non-radiation transition level or by a defect that could be a center of emission other than the confining level, and generate highly efficient emission in the ultraviolet region corresponding to the energy gap between quantum confining levels or to the confined exciton energy.

When a phosphor is formed by coating the surface of zinc oxide particle with one of or a solid solution of $LiGaO_2$, $LiAlO_2$, $NaGaO_2$ and $NaAlO_2$, peak wavelength of ultraviolet ray emitted therefrom can be controlled between 380 nm to 310 nm, by adjusting the diameter of zinc oxide particle (core) to 1 to 10 nm. Further, since the above materials have crystal structure similar to that of zinc oxide and have small lattice mismatch, epitaxial growth is possible when coating the surface of zinc oxide crystals. In addition, formation of crystal defects derived from lattice mismatch can be prevented.

With such effects, zinc oxide quantum dots (fine particles) that efficiently emit ultraviolet ray can be fabricated.

BEST MODES FOR CARRYING OUT THE INVENTION

For example, for fabricating core-shell $ZnO/LiGaO_2$ nanocrystals, a fabrication method of quantum dots structure can be a combination of a method of fabricating ZnO nanocrystals selected from among a number of fabrication methods described later and a selected method of coating with $LiGaO_2$ as a shell. Therefore, there are many possible methods of fabrication corresponding to the number of such combinations.

EXAMPLES

Method of Fabricating ZnO Nano Crystal

ZnO nanocrystals may be formed by solution synthesis either in an aqueous solution or in a non-aqueous solvent. For instance, it may be fabricated by any of: a method of heating zinc metal fine powder in an organic solvent having oxidizing agent dissolved therein (J. Cryst. Growth 252, 184 (2003)); a method of heating organic zinc compound in an organic solvent having a surfactant dissolved therein (for example, J. Phys. Chem. B 107, 4756 (2003), J. Phys. Chem. B 110, 4099 (2006)); and a sol-gel method of decomposing zinc carboxylate by alkaline substance (for example, Chem. Mater. 17, 3062 (2005), Aust. J. Chem. 56, 1051 (2003)).

Example 1

As the raw material, 99.99% (anhydrous) zinc acetate ($Zn(ac)_2$), 98% tert-butylphosphonic acid (TBPA) and 70% oleylamine were prepared.

Reagents other than oleylamine were used as offered commercially. Oleylamine was distilled before use. All reagents were handled in a glove box filled with nitrogen.

In a glass vial, 1.2 mol of $Zn(ac)_2$, 0.24 mmol of TBPA and 6 ml of oleylamine were put, and dissolved for 5 minutes using a tube mixer while being heated by a dryer. The resulting solution was heated for 7 to 20 minutes at 220° C. with argon bubbling using an oil bath, and thereafter taken out from the oil bath. By this method, colloidal particles of ZnO nanocrystals having the average particle size of 2 to 5.3 nm were obtained. The results are as shown in Table 1.

TABLE 1

Characteristics of ZnO nanocrystals

| Reaction time | Average particle size | Exciton absorption wavelength |
|---|---|---|
| 7 min. | 2.2 nm | 287 nm |
| 11 min. | 3.5 nm | 330 nm |
| 20 min. | 5.3 nm | 354 nm |

From zinc oxide nanocrystals having average particle size of 5 nm or smaller without any coating of $LiGaO_2$, $LiAlO_2$, $NaGaO_2$ or $NaAlO_2$, only the visible fluorescence with peak wavelength of 450 to 550 nm was observed. Fluorescence of ultraviolet ray originating from transition between quantum confining levels or fluorescence of ultraviolet ray resulting from exciton recombination was not detected. From zinc oxide nanocrystals having average particle size of 5 nm or larger, in addition to the visible fluorescence with peak wavelength of 450 to 550 nm, fluorescence of ultraviolet ray originating from transition between quantum confining levels or fluorescence of ultraviolet ray resulting from exciton recombination was very weakly detected, though florescence quantum efficiency thereof was smaller than 0.1.

Example 2

As the raw material, zinc di-tert-butoxide (purity not lower than 99%, $Zn(O^{-t}Bu)_2$), and benzylamine (purity 99%, BZA) were prepared. Reagents were used as offered commercially. All reagents were handled in a glove box filled with nitrogen.

Figure 4:
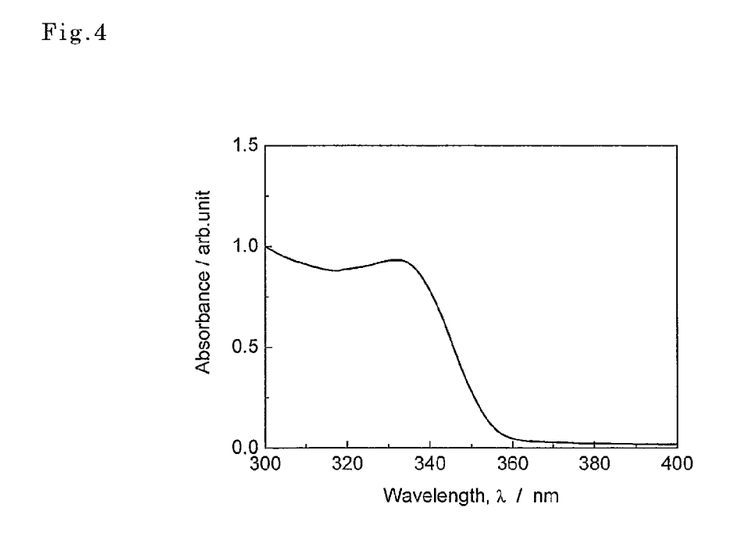
FIG. 4 A schematic view showing optical absorption spectrum of ZnO nanocrystals obtained in Example 2
Figure 5:
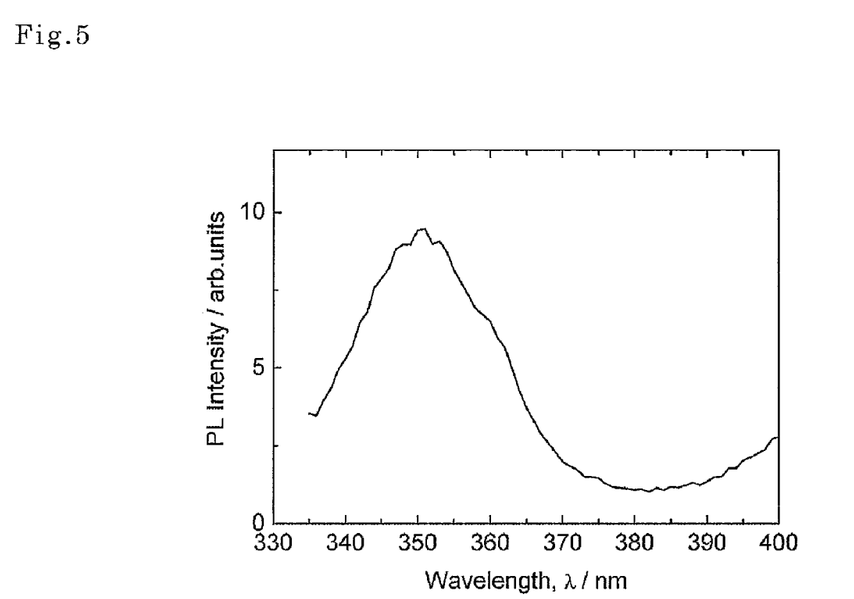
FIG. 5 A schematic view showing fluorescence spectrum of ZnO nanocrystals obtained in Example 2

In a glass vial, 0.1 mmol of $Zn(O^{-t}Bu)_2$ and 3 ml of BZA were put, and dissolved by shaking for 60 minutes at 60° C. using a constant-temperature shaker. Any insoluble matter left after shaking was removed by centrifugal separation. As a result, a clear and colorless colloidal solution of ZnO nanocrystals was obtained. To the resulting solution, 5 ml of ethanol was added and the mixture was subjected to centrifugal separation for 15 minutes. The precipitate was again dispersed in chloroform to provide a colloidal solution, of which optical absorption spectrum (FIG. 4) and fluorescence spectrum (FIG. 5) using light from a xenon lamp having the wavelength of 325 nm were measured. The precipitate was ultrasonic-cleaned with ethanol and thereafter vacuum-dried, resulting in a powder sample, of which powder X-ray diffraction was measured. Table 2 shows the particle size of ZnO evaluated from (102) diffraction, wavelength at optical absorption edge and ultraviolet fluorescence wavelength.

TABLE 2

| Particle size(nm) | Wavelength at optical absorption edge(nm) | Ultraviolet fluorescence wavelength(nm) |
|---|---|---|
| 3.1 | 332 | 351 |

Comparative Example 1

As the raw material, zinc di-tert-butoxide (purity not lower than 99%, $Zn(O^{-t}Bu)_2$), and benzylamine (purity 99%, BZA)

were prepared. All reagents were handled in a glove box filled with nitrogen. In a glass vial, 0.1 mmol of Zn(O-$^t$Bu)$_2$ and 3 ml of BZA were put, and dissolved by shaking for 60 minutes at 60° C. using a constant-temperature shaker. Any insoluble matter left after shaking was removed by centrifugal separation. The resulting solution was heated for 3 minutes at 170° C. with argon bubbling using an oil bath, and thereafter taken out from the oil bath. In this method, generated ZnO nanocrystals aggregated and yielded a turbid solution, and a clear and colorless colloidal solution was not obtained.

Example 3

As the raw material, zinc di-tert-butoxide (purity not lower than 99%, Zn(O-$^t$Bu)$_2$), benzylamine (purity 99%, BZA) and oleylamine (purity 70%, OA) were prepared. Reagents other than oleylamine were used as offered commercially. Oleylamine was distilled before use. All reagents were handled in a glove box filled with nitrogen.

Figure 6:
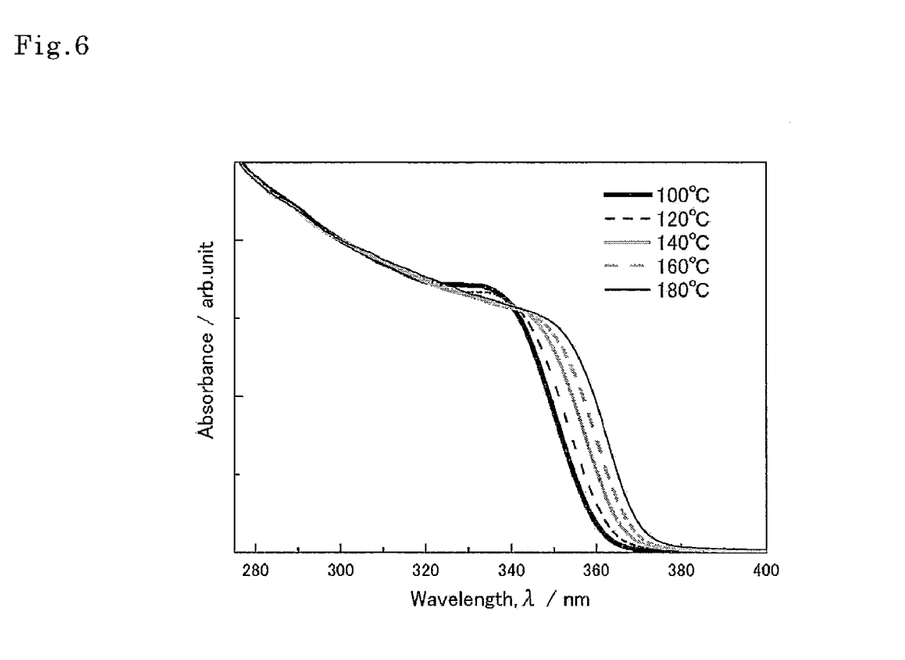
FIG. 6 A schematic view showing optical absorption spectrum of ZnO nanocrystals obtained in Example 3
Figure 7:
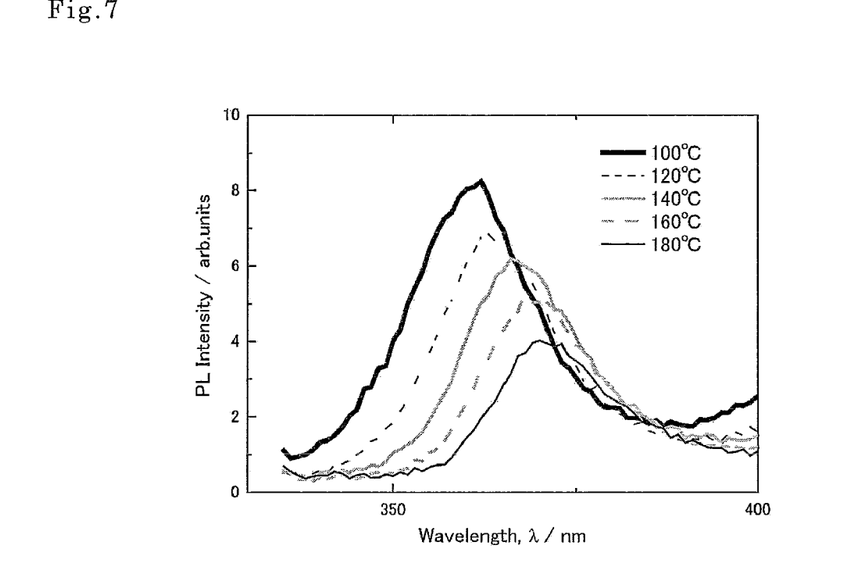
FIG. 7 A schematic view showing fluorescence spectrum of ZnO nanocrystals obtained in Example 3

In a glass vial, 0.1 mmol of Zn(O-$^t$Bu)$_2$ and 3 ml of BZA were put, and dissolved by shaking for 60 minutes at 60° C. using a constant-temperature shaker. Any insoluble matter left after shaking was removed by centrifugal separation. Thereafter, 3 ml of OA was added to the solution, and mixed for 5 minutes using a tube mixer. The resulting solution was heated for 10 minutes at 100 to 180° C. with argon bubbling using an oil bath, and thereafter taken out from the oil bath. By this method, a clear and colorless colloidal solution of ZnO nanocrystals was obtained. To the synthesized solution, 5 ml of ethanol was added and the mixture was subjected to centrifugal separation for 15 minutes. The precipitate was again dispersed in chloroform to provide a colloidal solution, of which optical absorption spectrum (FIG. 6) and fluorescence spectrum (FIG. 7) using light from a xenon lamp having the wavelength of 325 nm as the excitation light were measured. The precipitate was ultrasonic-cleaned with ethanol and thereafter vacuum-dried, resulting in a powder sample, of which powder X-ray diffraction was measured. Table 3 shows the particle size of ZnO evaluated from (102) diffraction, wavelength at optical absorption edge and ultraviolet fluorescence wavelength. When the reaction temperature was increased from 100° C. to 180° C., the particle size increased from 3.7 nm to 5.2 nm, meaning that the particle size is controllable by the heating temperature. Referring to FIG. 6, as the heating temperature increased and the particle size increased accordingly, the wavelength at the optical absorption edge of ZnO is shifted to longer wavelength, due to the quantum size effect. Referring to FIG. 7, as the particle size increased, the fluorescence in the ultraviolet region shifted to the longer wavelength, due to the quantum size effect.

TABLE 3

| Reaction temperature (° C.) | Particle size(nm) | Wavelength at optical absorption edge(nm) | Ultraviolet fluorescence wavelength(nm) |
| --- | --- | --- | --- |
| 100 | 3.7 | 333 | 361 |
| 120 | 4.4 | 335 | 364 |
| 140 | 4.8 | 340 | 366 |
| 160 | 4.8 | 344 | 369 |
| 180 | 5.2 | 348 | 371 |

Example 4

As the raw material, zinc di-tert-butoxide (purity not lower than 99%, Zn(O-$^t$Bu)$_2$), benzylamine (purity 99%, BZA) and tri-octyl-phosphine oxide (purity not lower than 95%, TOPO) were prepared. Reagents were used as offered commercially. All reagents were handled in a glove box filled with nitrogen.

Figure 8:
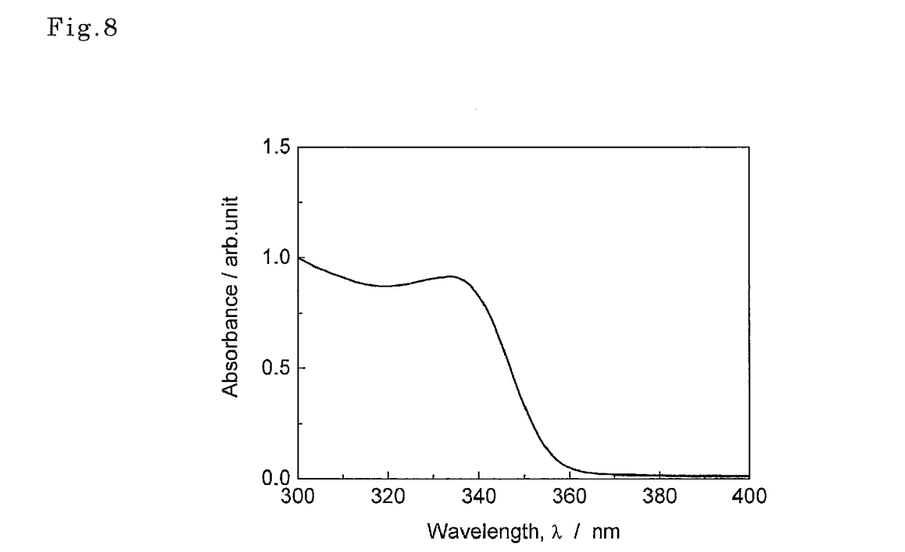
FIG. 8 A schematic view showing optical absorption spectrum of ZnO nanocrystals obtained in Example 4
Figure 9:
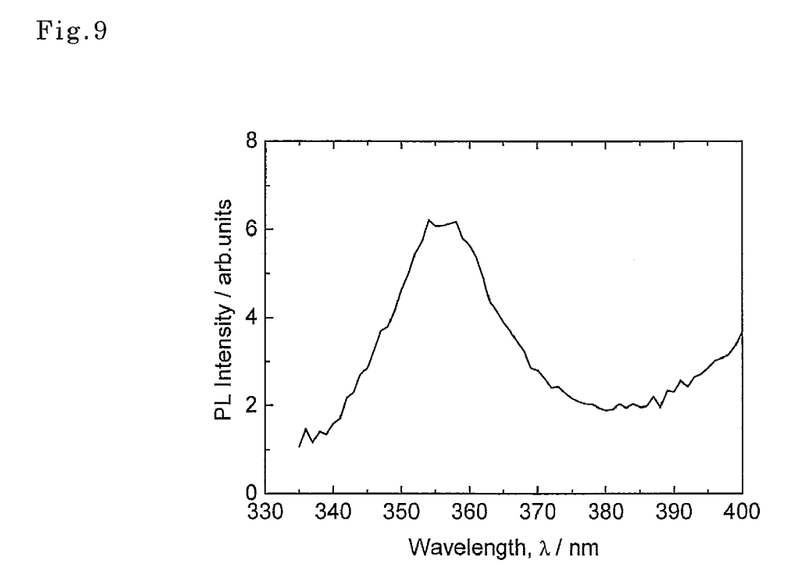
FIG. 9 A schematic view showing fluorescence spectrum of ZnO nanocrystals obtained in Example 4

In a glass vial, 0.1 mmol of Zn(O-$^t$Bu)$_2$ and 3 ml of BZA were put, and dissolved by shaking for 60 minutes at 60° C. using a constant-temperature shaker. Any insoluble matter left after shaking was removed by centrifugal separation. Thereafter, 10 mmol of TOPO was added, and dissolved for 5 minutes using a tube mixer while being heated by a dryer. The resulting solution was heated for 10 minutes at 100° C. with argon bubbling using an oil bath, and thereafter taken out from the oil bath. By this method, a clear and colorless colloidal solution of ZnO nanocrystals was obtained. To the resulting solution, 5 ml of ethanol was added and the mixture was subjected to centrifugal separation for 15 minutes. The precipitate was again dispersed in chloroform to provide a colloidal solution, of which optical absorption spectrum (FIG. 8) and fluorescence spectrum (FIG. 9) using light from a xenon lamp having the wavelength of 325 nm as the excitation light were measured. The precipitate was ultrasonic-cleaned with ethanol and thereafter vacuum-dried, resulting in a powder sample, of which powder X-ray diffraction was measured. Table 4 shows the particle size of ZnO evaluated from (102) diffraction, wavelength at optical absorption edge and ultraviolet fluorescence wavelength.

TABLE 4

| Particle size(nm) | Wavelength at optical absorption edge(nm) | Ultraviolet fluorescence wavelength(nm) |
| --- | --- | --- |
| 4.1 | 335 | 356 |

Example 5

As the raw material, zinc di-tert-butoxide (purity not lower than 99%, Zn(O-$^t$Bu)$_2$), benzylamine (purity 99%, BZA) and oleylamine (purity 70%, OA) were prepared. Reagents other than oleylamine were used as offered commercially. Oleylamine was distilled before use. All reagents were handled in a glove box filled with nitrogen.

Figure 10:
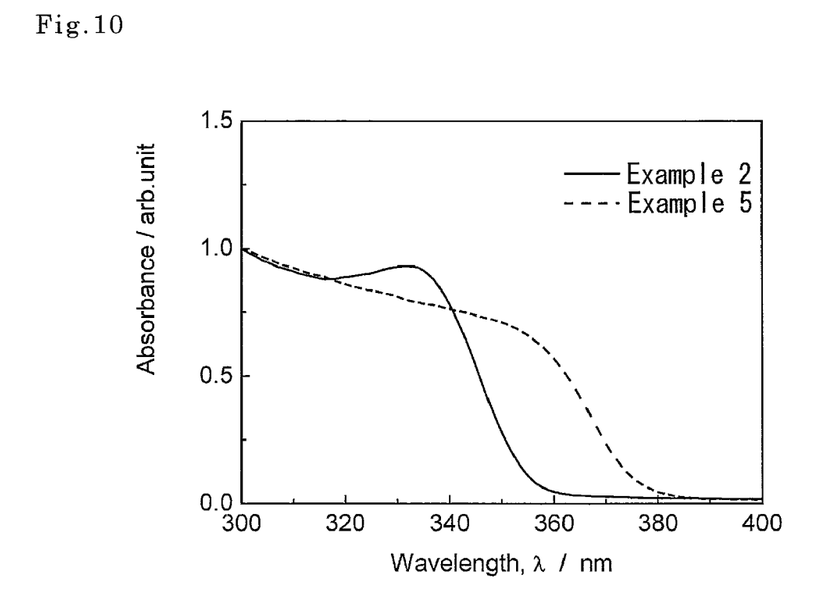
FIG. 10 A schematic view showing optical absorption spectra of ZnO nanocrystals obtained in Example 2 and Example 5
Figure 11:
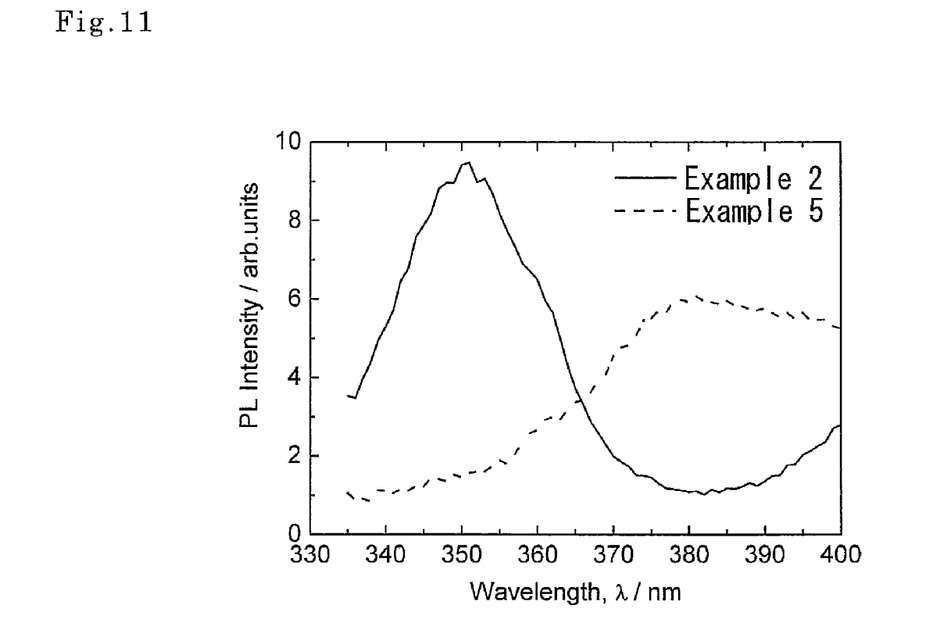
FIG. 11 A schematic view showing fluorescence spectra of ZnO nanocrystals obtained in Example 2 and Example 5

In a glass vial, 0.1 mmol of Zn(O-$^t$Bu)$_2$ and 3 ml of BZA were put, and dissolved by shaking for 60 minutes at 60° C. using a constant-temperature shaker. Any insoluble matter left after shaking was removed by centrifugal separation. To the solution twice the amount (sum=6 ml), 10 ml of ethanol was added and the mixture was subjected to centrifugal separation for 15 minutes. Liquid part after centrifugal separation was discarded, 3 ml of OA was added to the remaining precipitate, and the mixture was dispersed again using a tube mixer for 5 minutes to provide a colloidal solution. The resulting solution was heated for 3 hours at 280° C. with argon bubbling using an oil bath, and thereafter taken out from the oil bath. The solution obtained by the reaction was slightly yellowish clear colloidal solution of ZnO nanocrystals. To the resulting solution, 5 ml of ethanol was added and the mixture was subjected to centrifugal separation for 15 minutes. The precipitate was again dispersed in chloroform to provide a colloidal solution, of which optical absorption spectrum (FIG. 10) and fluorescence spectrum (FIG. 11) using light from a xenon lamp having the wavelength of 325 nm as the excitation light were measured. The precipitate was ultrasonic-cleaned with ethanol and thereafter vacuum-dried, resulting in a powder sample, of which powder X-ray diffraction was measured. Table 5 shows the particle size of ZnO evaluated from (102) diffraction, wavelength at optical absorption edge and ultraviolet fluorescence wavelength. As compared with the ZnO nanocrystals synthesized by dissolving Zn(O-$^t$Bu)$_2$ in BZA at 60° C. (Example 2), the particle size could be increased because of heating at 280° C. Referring to FIG. 10, as the reaction temperature increased and the particle size increased accordingly, the wavelength at the optical absorption edge of ZnO is shifted to longer wavelength, due to the quantum size effect. Referring to FIG. 11, as the particle size increased, the fluorescence in the ultraviolet region shifted to the longer wavelength, due to the quantum size effect.

TABLE 5

|  | Particle size(nm) | Wavelength at optical absorption edge(nm) | Ultraviolet fluorescence wavelength(nm) |
| --- | --- | --- | --- |
| Example 5 | 3.4 | 354 | 380 |
| Example 2 | 3.1 | 333 | 351 |

Method of Fabricating Core-Shell ZnO/LiGaO$_2$ Nanocrystals with LiGaO$_2$ Coating Example 6

Figure 1:
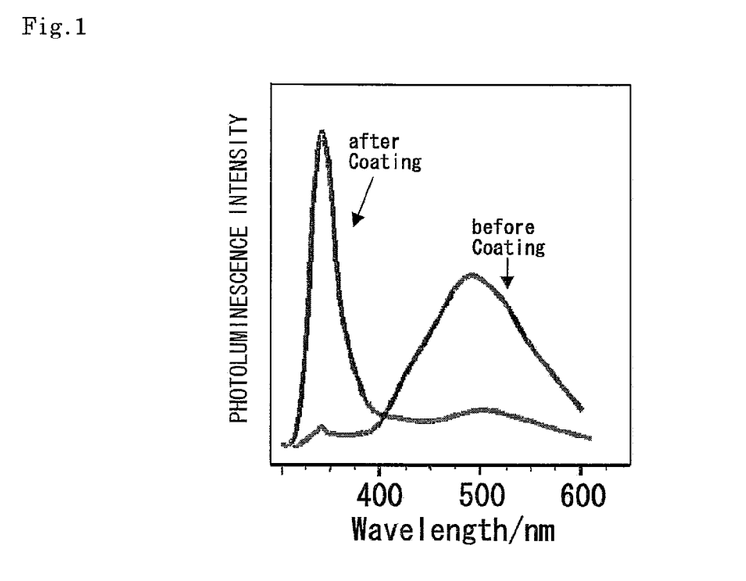
FIG. 1 A schematic view showing comparison between emission spectra before and after coating of zinc oxide nanoparticles FIG. 2 A schematic view showing a relation between HRTEM images and particle size distribution FIG. 3 A schematic view showing band alignment of zinc oxide (ZnO) and semiconductor shell materials ($ABO_2$)

In a glass vial, 79.5 mg to 159.2 mg (0.75 mmol to 1.5 mmol) of lithium acetylacetonate (Li(acac)) and 0.5799 g to 1.1560 g (1.5 mmol to 3 mmol) of trioctyl-phosphine oxide (TOPO) [molar ratio between Li(acac) and TOPO is fixed at 1:2] were put, and dissolved for 60 minutes at 120° C. with argon bubbling using an oil bath, to provide a Li raw material solution. Further, 91.8 mg to 183.5 mg (0.25 to 0.5 mmol) of gallium acetylacetonate (GA(acac)$_3$) was dissolved in 5 ml of benzyl amine at room temperature, to provide a Ga raw material solution. The Li raw material solution and the Ga raw material solution were mixed and subjected to centrifugal separation for 5 minutes, and the separated supernatant was used as a LiGaO$_2$ solution. Zinc oxide nanocrystals synthesized by the methods described above were recovered and colloidally dispersed in 10 ml of benzyl amine, to prepare zinc oxide solutions. LiGaO$_2$ solution and each zinc oxide solution were put in an autoclave vessel (volume: 50 ml) formed of Teflon (registered trademark) and sealed in an autoclave of stainless steel, and subjected to reaction for 12 hours at 170° C. During the reaction, the pressure in the autoclave was autogenous pressure of mixed solvent at 170° C. The solution after reaction was subjected to centrifugal separation until supernatant became clear. The precipitate was ultrasonic-cleaned with methanol, butanol and ethanol, and thereafter vacuum-dried, resulting in powder samples. With the average particle size of the core of 2.2 nm to 4.7 nm and the average particle size after shell coating of 3.6 nm to 5.3 nm, fluorescence spectra having single peaks of 298 nm to 356 nm originating from exciton level confined in the core-shell quantum dot were attained. The full width at half maximum of the peak was 30 nm, and the samples had fluorescence quantum yield of 0.6 to 0.8. Table 6 shows results of measurements of the fabricated core-shell nano particles. FIG. 1 shows comparison between emission spectra before and after coating of the nano particles.

TABLE 6

Results of core-shell ZnO/LiGaO$_2$ with LiGaO$_2$ coating

| No. | Particle size of core zinc oxide | Particle size after LiGaO$_2$ coating | Exciton absorption wavelength | Exciton emission wavelength |
| --- | --- | --- | --- | --- |
| Example 6-1 | 2.2 nm | 3.6 nm | 290 nm | 298 nm |
| Example 6-2 | 3.5 nm | 4.4 nm | 335 nm | 341 nm |
| Example 6-3 | 4.7 nm | 5.3 nm | 350 nm | 356 nm |

Example 7

In a glass vial, 0.3 mmol of gallium palmitate, 0.2 mmol of lithium isopropoxide and 3 ml of oleylamine were put and dissolved by shaking for 60 minutes at 60° C. using a shaker, to provide a LiGaO$_2$ solution. Zinc oxide nanocrystals synthesized by one of the methods described above were recovered and colloidally dispersed in 3 ml of oleylamine, and mixed with the LiGaO$_2$ solution. The mixed solution was subjected to centrifugal separation for 5 minutes, and only the supernatant was used as a starting solution. The starting solution was heated for 1 hour at 180 to 250° C. with argon bubbling using an oil bath. To the synthesized solution, 40 ml of ethanol was added and the mixture was subjected to centrifugal separation for 5 minutes. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 343 nm originating from exciton level confined in the core-shell quantum dot was attained. The full width at half maximum of the peak was 30 nm, and the sample had fluorescence quantum yield of 0.7. Table 7 shows results of measurements of the fabricated core-shell nano particles.

TABLE 7

Results of core-shell ZnO/LiGaO$_2$ with LiGaO$_2$ coating

| No. | Particle size of core zinc oxide | Particle size after LiGaO$_2$ coating | Exciton absorption wavelength | Exciton emission wavelength |
| --- | --- | --- | --- | --- |
| Example 7-1 | 3.5 nm | 4.8 nm | 335 nm | 343 nm |

Comparative Example 2

In a glass vial, 49.4 mg (0.2 mmol) of gallium isopropoxide (Ga(OPr$^i$)$_3$), 173.7 mg (2 mmol) of lithium bromide (LiBr) and 3 ml of oleylamine were put and dissolved by shaking for 60 minutes at 60° C. using a shaker, to provide a LiGaO$_2$ solution. Zinc oxide nanocrystals synthesized by one of the methods described above were recovered and colloidally dispersed in 3 ml of oleylamine, and mixed with the LiGaO$_2$ solution. The mixed solution was subjected to centrifugal separation for 5 minutes, and only the supernatant was used as a starting solution. The starting solution was heated for 1 hour at 180 to 250° C. with argon bubbling using an oil bath. To the synthesized solution, 40 ml of ethanol was added and the mixture was subjected to centrifugal separation for 5 minutes. The precipitate was ultrasonic-cleaned with methanol, butanol and ethanol, and thereafter vacuum-dried, resulting in a powder sample. Table 7 shows results of measurements of the fabricated nano particles.

TABLE 8

Results of measurements of nano particles

| No. | Particle size of core zinc oxide | Particle size after LiGaO$_2$ coating | Exciton absorption wavelength | Exciton emission wavelength |
|---|---|---|---|---|
| Comparative Example 2-1 | 3.5 nm | 2.5 nm | Not detected | Not detected |

ZnO was decomposed by HBr or alkyl halide as by-products of LiGaO$_2$ formation reaction, and the resulting particles did not exhibit the characteristics of ZnO. Use of a reaction system that involves generation of hydrogen halide or alkyl halide as by-product in the synthesizing process is unsuitable, since it leads to decomposition of the core and hinders generation of a shell.

Figure 2:
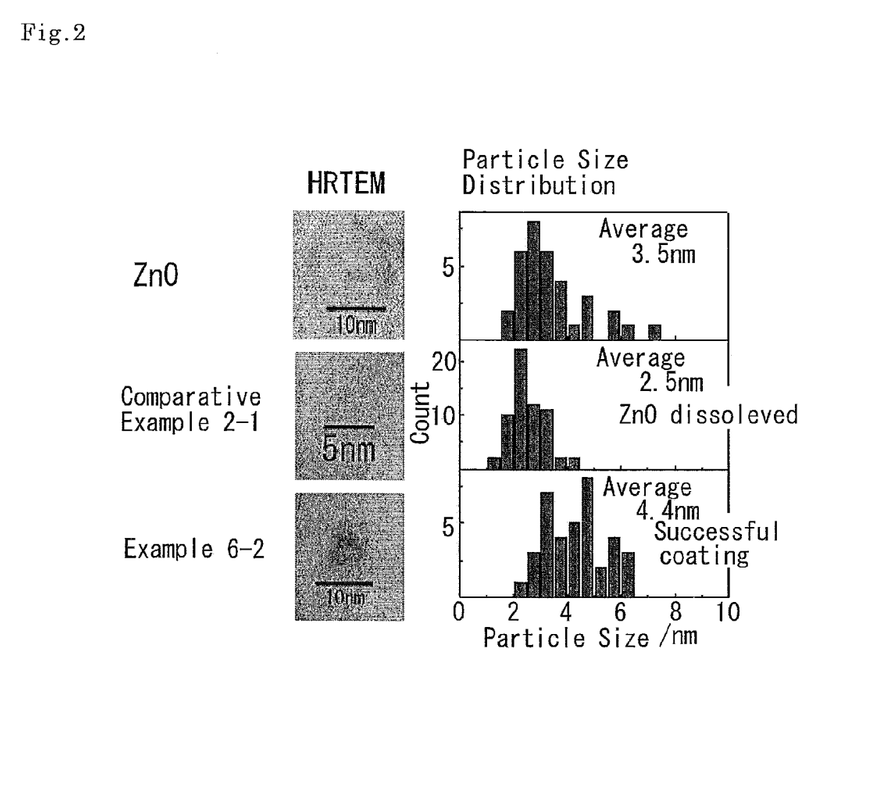

FIG. 2 shows HRTEM (High Resolution Transmission Electron Microscopy) images and histograms of particle size distribution of the fabricated ZnO particles, nano particles fabricated in Comparative Example 2-1 and core-shell nano particles fabricated in Example 6-2.

Method of Coating with LiAlO$_2$

Example 8

In a glass vial, 79.5 mg to 159.2 mg (0.75 mmol to 1.5 mmol) of Li(acac) and 0.5799 g to 1.1560 g (1.5 mmol to 3 mmol) of TOPO [molar ratio between Li(acac) and TOPO is fixed at 1:2] were put, and dissolved for 60 minutes at 120° C. with argon bubbling using an oil bath, to provide a Li raw material solution. Further, 81.1 mg to 162.2 mg (0.25 to 0.5 mmol) of aluminum acetylacetonate (Al(acac)$_3$) was dissolved in 5 ml of benzyl amine at room temperature, to provide an Al raw material solution. The Li raw material solution and the Al raw material solution were mixed and subjected to centrifugal separation for 5 minutes, and the separated supernatant was used as a LiAlO$_2$ solution. Zinc oxide nanocrystals synthesized by one of the methods described above were recovered and colloidally dispersed in 10 ml of benzyl amine, to prepare a zinc oxide solution. The LiAlO$_2$ solution and the zinc oxide solution were put in an autoclave vessel (volume: 50 ml) formed of Teflon (registered trademark) and sealed in an autoclave of stainless steel, and subjected to reaction for 12 hours at 170° C. The solution after reaction was subjected to centrifugal separation until supernatant became clear. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 342 nm originating from exciton level confined in the core-shell quantum dot was attained. The full width at half maximum of the peak was 30 nm, and the sample had fluorescence quantum yield of 0.8.

Example 9

In a glass vial, 0.3 mmol of aluminum stearate, 0.2 mmol of lithium isopropoxide and 3 ml of oleylamine were put and dissolved by shaking for 60 minutes at 60° C. using a shaker to provide a LiAlO$_2$ solution. Zinc oxide nanocrystals synthesized by one of the methods described above were recovered and colloidally dispersed in 3 ml of oleylamine, and mixed with the LiAlO$_2$ solution. The mixed solution was subjected to centrifugal separation for 5 minutes, and only the supernatant was used as the starting solution. The starting solution was heated for 1 hour at 180 to 250° C. with argon bubbling using an oil bath. To the synthesized solution, 40 ml of ethanol was added and the mixture was subjected to centrifugal separation for 5 minutes. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 343 nm originating from exciton level confined in the core-shell quantum dot was attained. The full width at half maximum of the peak was 30 nm, and the sample had fluorescence quantum yield of 0.7.

Method of Coating with NaGaO$_2$

Example 10

In a glass vial, 61.5 mg to 133.0 mg (0.75 mmol to 1.5 mmol) of anhydrous sodium acetate and 0.5799 g to 1.1560 g (1.5 mmol to 3 mmol) of TOPO [molar ratio between anhydrous sodium acetate and TOPO is fixed at 1:2] were put, and dissolved for 60 minutes at 120° C. with argon bubbling using an oil bath, to provide a Na raw material solution. Further, 91.8 mg to 183.5 mg (0.25 to 0.5 mmol) of Ga(acac)$_3$) was dissolved in 5 ml of benzyl amine at room temperature, to provide an Ga raw material solution. The Na raw material solution and the Ga raw material solution were mixed and subjected to centrifugal separation for 5 minutes, and the separated supernatant was used as a NaGaO$_2$ solution. Zinc oxide nanocrystals synthesized by one of the methods described above were recovered and colloidally dispersed in 10 ml of benzyl amine, to prepare a zinc oxide solution. The NaGaO$_2$ solution and the zinc oxide solution were put in an autoclave vessel (volume: 50 ml) formed of Teflon (registered trademark) and sealed in an autoclave of stainless steel, and subjected to reaction for 12 hours at 170° C. The solution after reaction was subjected to centrifugal separation until supernatant became clear. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 343 nm originating from exciton level confined in the core-shell quantum dot was attained. The full width at half maximum of the peak was 30 nm, and the sample had fluorescence quantum yield of 0.7.

Example 11

In a glass vial, 0.3 mmol of gallium palmitate, 0.2 mmol of sodium tert-butoxide and 3 ml of oleylamine were put, and dissolved by shaking for 60 minutes at 60° C. using a shaker to provide a NaGaO$_2$ solution. Zinc oxide nanocrystals synthesized by one of the methods described above were recovered, colloidally dispersed in 3 ml of oleylamine, and mixed with the NaGaO$_2$ solution. The mixed solution was subjected to centrifugal separation for 5 minutes, and the separated supernatant was used as the starting solution. The starting solution was heated for 1 hour at 180 to 250° C. with argon bubbling using an oil bath. To the synthesized solution, 40 ml of ethanol was added and the mixture was subjected to centrifugal separation for 5 minutes. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 343 nm originating from exciton level confined in the core-shell quantum dot was attained. The full width at half maximum of the peak was 30 nm, and the sample had fluorescence quantum yield of 0.7.

Method of Coating with $NaAlO_2$

Example 12

In a glass vial, 61.5 mg to 133.0 mg (0.75 mmol to 1.5 mmol) of anhydrous sodium acetate and 0.5799 g to 1.1560 g (1.5 mmol to 3 mmol) of TOPO [molar ratio between anhydrous sodium acetate and TOPO is fixed at 1:2] were put, and dissolved for 60 minutes at 120° C. with argon bubbling using an oil bath, to provide a Na raw material solution. Further, 81.1 mg to 162.2 mg (0.25 to 0.5 mmol) of $Al(acac)_3$ was dissolved in 5 ml of benzyl amine at room temperature, to provide an Al raw material solution. The Na raw material solution and the Al raw material solution were mixed and subjected to centrifugal separation for 5 minutes, and the separated supernatant was used as a $NaAlO_2$ solution. Zinc oxide nanocrystals synthesized by one of the methods described above were recovered and colloidally dispersed in 10 ml of benzyl amine, to prepare a zinc oxide solution. The $NaAlO_2$ solution and the zinc oxide solution were put in an autoclave vessel (volume: 50 ml) formed of Teflon (registered trademark) and sealed in an autoclave of stainless steel, and subjected to reaction for 12 hours at 170° C. The solution after reaction was subjected to centrifugal separation until supernatant became clear. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 342 nm originating from exciton level confined in the core-shell quantum dot was attained. The full width at half maximum of the peak was 30 nm, and the sample had fluorescence quantum yield of 0.8.

Example 13

In a glass vial, 0.3 mmol of aluminum stearate, 0.2 mmol of sodium tert-butoxide and 3 ml of oleylamine were put, and dissolved by shaking for 60 minutes at 60° C. using a shaker to provide a $NaAlO_2$ solution. Zinc oxide nanocrystals synthesized by one of the methods described above were recovered, colloidally dispersed in 3 ml of oleylamine, and mixed with the $NaAlO_2$ solution. The mixed solution was subjected to centrifugal separation for 5 minutes, and the separated supernatant was used as the starting solution. The starting solution was heated for 1 hour at 180 to 250° C. with argon bubbling using an oil bath. To the synthesized solution, 40 ml of ethanol was added and the mixture was subjected to centrifugal separation for 5 minutes. The precipitate was ultrasonic-cleaned with methanol, butanol and ethanol, and thereafter vacuum-dried, resulting in a powder sample. With the average particle size of the core of 3.5 nm and the average particle size after shell coating of 4.8 nm, a fluorescence spectrum having a single peak of 342 nm originating from exciton level confined in the core-shell quantum dot was attained. The full width at half maximum of the peak was 30 nm, and the sample had fluorescence quantum yield of 0.8.

What is claimed is:

1. Core-shell quantum dot fluorescent fine particles, each having
   a core formed of zinc oxide nanocrystals having average diameter of 1 nm to 7 nm, and ultraviolet fluorescence wavelength of 371 nm or shorter
   a semiconductor shell formed of any of lithium gallium oxide, lithium aluminum oxide, sodium gallium oxide and sodium aluminum oxide, coating the surface of said core; wherein
   said core and said semiconductor shell form a type I three-dimensional quantum well.

2. The core-shell quantum dot fluorescent fine particles according to claim 1, wherein said semiconductor shell has its surface modified by an organic compound molecule, and said fluorescent fine particles can be dispersed in a solvent.

3. The core-shell quantum dot fluorescent fine particles according to claim 1, wherein said semiconductor shell is formed by solution synthesis.

4. Core shell quantum dot fluorescent fine particles, each having
   a core formed of zinc oxide nanocrystals having average diameter of 1 nm to 10 nm, and
   a semiconductor shell formed of a solid solution of at least two selected from lithium gallium oxide, lithium aluminum oxide, sodium gallium oxide and sodium aluminum oxide, coating the surface of said core; wherein
   energy of the top of the valence band of said semiconductor shell is lower than energy of the top of the valence band of said core, and energy of the bottom of the conduction band of said semiconductor shell is higher than energy of the bottom of the conduction band of said core; and
   said core and said semiconductor shell form a type I three-dimensional quantum well.

5. Core shell quantum dot fluorescent fine particles, each having
   a core formed of zinc oxide nanocrystals having average diameter of 1 nm to 10 nm, and
   a semiconductor shell formed of any of $LiGaO_2$, $LiAlO_2$, $NaGaO_2$ and $NaAlO_2$, coating the surface of said core; wherein said core and said semiconductor shell form a type I three-dimensional quantum well.

6. Core shell quantum dot fluorescent fine particles, each having
a core formed of zinc oxide nanocrystals having average diameter of 1 nm to 10 nm, and
a semiconductor shell formed of a solid solution of at least two selected from $LiGaO_2$, $LiAlO_2$, $NaGaO_2$ and $NaAlO_2$, coating the surface of said core; wherein
energy of the top of the valence band of said semiconductor shell is lower than energy of the top of the valence band of said core, and energy of the bottom of the conduction band of said semiconductor shell is higher than energy of the bottom of the conduction band of said core; and
said core and said semiconductor shell form a type I three-dimensional quantum well.

7. The core-shell quantum dot fluorescent fine particles according to any of claims 1 to 2, wherein thickness of said semiconductor shell is 0.1 nm to 5 nm.

* * * * *